(12) United States Patent
Queiroz de Macedo et al.

(10) Patent No.: US 11,520,390 B2
(45) Date of Patent: Dec. 6, 2022

(54) RECEIVING THERMAL DATA AND PRODUCING SYSTEM THERMAL GRADES

(71) Applicant: Hewlett-Packard Development Company, L.P., Spring, TX (US)

(72) Inventors: Augusto Queiroz de Macedo, Porto Alegre (BR); Giovani Cavalcante Barbosa, Porto Alegre (BR); Italo Renan De Macedo Lins, Porto Alegre (BR); Rafael Oliveira Santos, Porto Alegre (BR); Tatiana Saturno da Silva, Porto Alegre (BR); Eanes Torres Pereira, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/262,282

(22) PCT Filed: Nov. 7, 2018

(86) PCT No.: PCT/US2018/059699
§ 371 (c)(1),
(2) Date: Jan. 22, 2021

(87) PCT Pub. No.: WO2020/096595
PCT Pub. Date: May 14, 2020

(65) Prior Publication Data
US 2021/0263502 A1    Aug. 26, 2021

(51) Int. Cl.
*G06F 1/20*    (2006.01)
(52) U.S. Cl.
CPC ................... *G06F 1/206* (2013.01)

(58) Field of Classification Search
CPC ...... G05B 19/4155; G05B 2219/49216; G06F 11/3058; G06F 11/3419; G06F 11/3476; G06F 2201/81; G06F 1/206
See application file for complete search history.

(56) References Cited

U.S. PATENT DOCUMENTS

| | | | |
|---|---|---|---|
| 4,823,290 A | 4/1989 | Fasack et al. | |
| 6,889,908 B2 | 5/2005 | Crippen et al. | |
| 6,950,773 B1 | 9/2005 | Gross et al. | |
| 7,310,590 B1 | 12/2007 | Bansal | |
| 10,095,288 B2 * | 10/2018 | Shabbir | H05K 7/20727 |
| 2004/0262409 A1 * | 12/2004 | Crippen | H05K 7/20727 165/80.3 |
| 2007/0291817 A1 | 12/2007 | Bradicich et al. | |
| 2009/0138228 A1 * | 5/2009 | Dalton | G06F 1/206 702/130 |
| 2009/0210097 A1 | 8/2009 | Sawczak et al. | |
| 2013/0090889 A1 | 4/2013 | Vaidyanathan et al. | |
| 2017/0235598 A1 | 8/2017 | Yang et al. | |
| 2018/0096261 A1 | 4/2018 | Chu et al. | |
| 2021/0334656 A1 * | 10/2021 | Sjögren | G06N 3/08 |

FOREIGN PATENT DOCUMENTS

CN    101025618    8/2007

* cited by examiner

*Primary Examiner* — Chun Cao
(74) *Attorney, Agent, or Firm* — Conley Rose PC

(57) ABSTRACT

An example of a computer-readable medium storing machine-readable instructions. The instructions may cause the processor to receive thermal data for a device and apply anomaly models to the thermal data to produce grades. Grades for a device may be combined into a system thermal grade and corrective actions identified to improve the system thermal grade.

16 Claims, 4 Drawing Sheets

RECEIVING THERMAL DATA AND PRODUCING SYSTEM THERMAL GRADES

BACKGROUND

Electronic devices may generate heat during operation. The devices may include fans, heat sinks, or other heat dissipation elements. As a device ages, its thermal characteristics may change.

BRIEF DESCRIPTION OF THE DRAWINGS

Various examples will be described below referring to the following figures.

DETAILED DESCRIPTION

Figure 1:
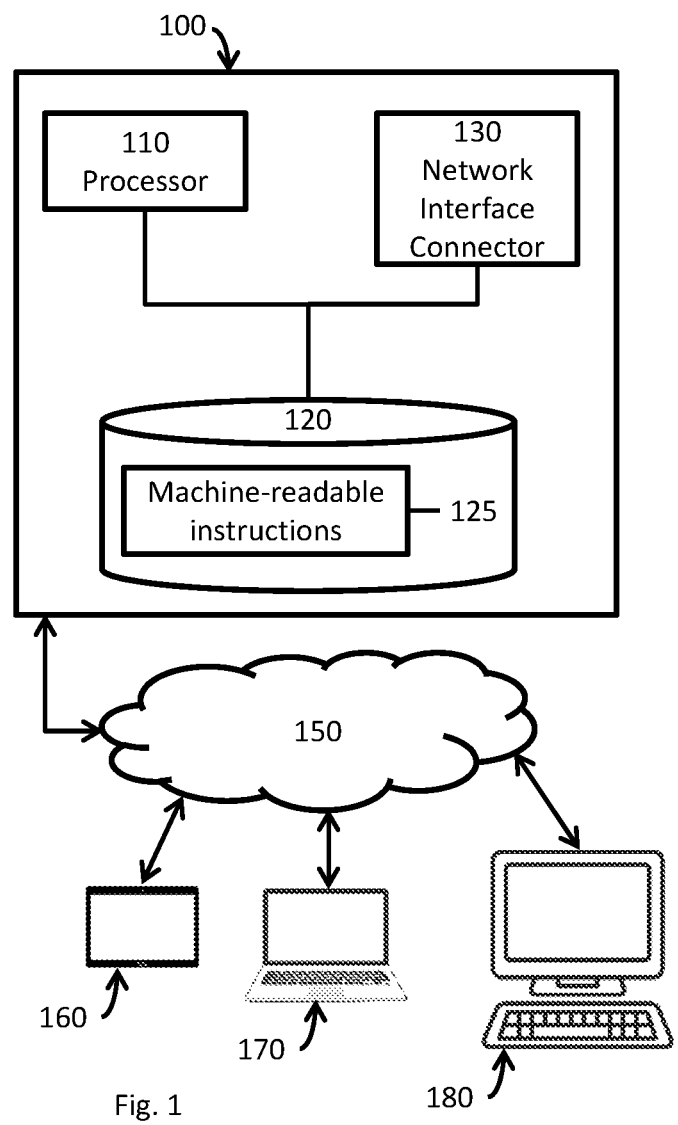
FIG. 1 shows a fleet management system to collect thermal data and identify corrective actions for a fleet of electronic devices in accordance with various examples.

Thermal issues with an electronic device can lead to a damaged device or even an explosion. Different devices have distinct thermal characteristics. A fleet of devices may experience thermal issues at various times. Predicting or diagnosing thermal issues may allow for corrective action to be taken.

A fleet management system may collect thermal data from a fleet of devices. Based on anomaly models, the fleet management system may calculate a thermal grade for a device or even for specific components of the device. The grades may be used in scheduling maintenance and repair of the fleet of devices.

In one example in accordance with the present disclosure, an apparatus is provided. The apparatus comprises a non-transitory computer-readable medium to store machine-readable instructions that, when executed by a processor, cause the processor to: receive a first set of data that includes thermal data for a first device; apply a first anomaly model to the first set of data to produce a first anomaly grade; apply a second anomaly model to the first set of data to produce a second anomaly grade; produce a first system thermal grade corresponding to the first device based on the first anomaly grade and the second anomaly grade; identify a corrective action to apply to the first device to improve the first system thermal grade based on one of the first anomaly grade and the second anomaly grade; and control the first device to perform the corrective action.

In one example in accordance with the present disclosure, an apparatus is provided. The apparatus comprises a non-transitory computer-readable medium to store machine-readable instructions that, when executed by a processor, cause the processor to: receive a first set of data that includes thermal data for a first component of a device; receive a second set of data that includes thermal data for a second component of the device; apply a first anomaly model to the first set of data to produce a first anomaly grade; apply a second anomaly model to the second set of data to produce a second anomaly grade; produce a first system thermal grade corresponding to the device based on the first anomaly grade and the second anomaly grade; identify a corrective action to apply to the device to improve the first system thermal grade based on one of the first anomaly grade and the second anomaly grade; and control the device to perform the corrective action.

In one example in accordance with the present disclosure, an apparatus is provided. The apparatus comprises a non-transitory computer-readable medium to store machine-readable instructions that, when executed by a processor, cause the processor to: receive a first set of data that includes thermal data for a device corresponding to a first time; apply an anomaly model to the first set of data to produce a first anomaly grade; receive a second set of data that includes thermal data for the device corresponding to a second time; apply the anomaly model to the second set of data to produce a second anomaly grade; identify a trend based on the first and second anomaly grades; identify a corrective action to apply to the device based on the trend; and control the device to perform the corrective action.

FIG. 1 shows a fleet management system 100 to collect thermal data and identify corrective actions for a fleet of electronic devices 160, 170, 180 in accordance with various examples. Fleet management system 100 may include a processor 110, a computer-readable medium 120, and a network interface connector 130. The computer-readable medium 120 may include machine-readable instructions 125 for execution by the processor 110. When executed by the processor 110, the machine-readable instructions 125 may cause the processor 110 to perform methods, such as the methods disclosed in connection with the other figures herein. The machine-readable instructions 125 may be part of an application installed on the fleet management system 100.

The fleet management system 100 may include a server, a laptop or desktop computer, a tablet, or another electronic device. The fleet management system 100 may be a distributed computer system composed of multiple electronic devices. The processor 110 may comprise a microprocessor, a microcomputer, a microcontroller, a field programmable gate array (FPGA), or discrete logic to execute machine-readable instructions. The computer-readable medium 120 may include a hard drive, solid state drive (SSD), flash memory, electrically erasable programmable read-only memory (EEPROM), or random access memory (RAM). The network interface connector 130 may couple the fleet management system 100 to the fleet of electronic devices 160, 170, 180 via a wired connection, such as an Ethernet cable or Universal Serial Bus (USB) or via a wireless connection, such as WiFi. The connection may be via a network 150, which may include the Internet. The fleet of electronic devices 160, 170, 180 may include a tablet 160, a laptop computer 170, a desktop computer 180, a server, and a cell phone.

Figure 2:
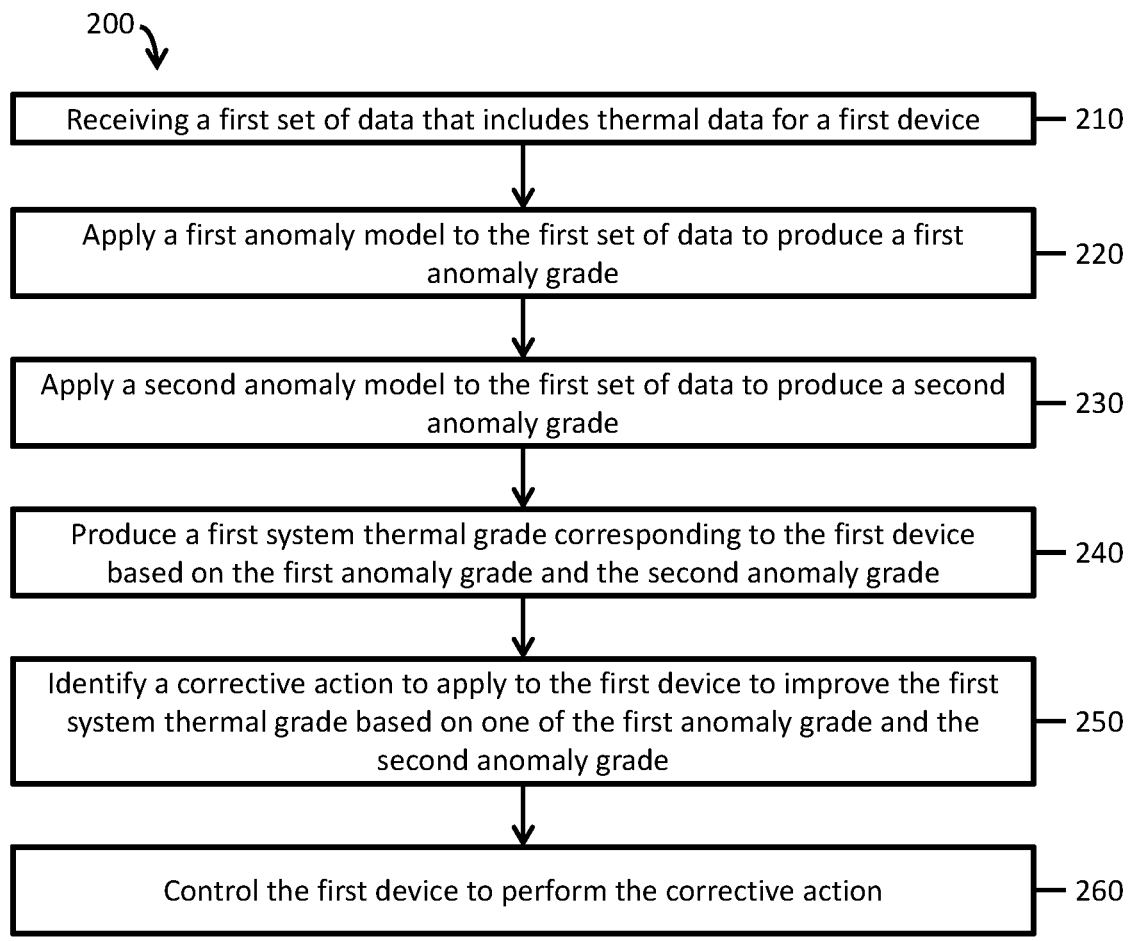
FIG. 2 shows a method of applying anomaly models to thermal data collected about a device in accordance with various examples.

FIG. 2 shows a method 200 of applying anomaly models to thermal data collected about a device in accordance with various examples. The method 200 includes receiving a first set of data that includes thermal data for a first device (210). The method 200 includes applying a first anomaly model to the first set of data to produce a first anomaly grade (220). The method 200 includes applying a second anomaly model to the first set of data to produce a second anomaly grade (230). The method 200 includes producing a first system thermal grade corresponding to the first device based on the first anomaly grade and the second anomaly grade (240). The method 200 includes identifying a corrective action to apply to the first device to improve the first system thermal grade based on one of the first anomaly grade and the second anomaly grade (250). The method 200 includes sending a message to the first device based on the corrective action (260).

In various examples, a fleet management system may receive data about the operation of various devices. The devices may include servers, laptop computers, desktop computers, printers, cell phones, tablets, routers, or other equipment. The received data may include thermal data, such as regarding heat generation or heat dissipation systems. For example, data regarding a laptop computer may include a processor temperature, processor power, processor speed, fan speed, environment temperature, graphics processor temperature, graphics processor speed, monitor temperature, keyboard temperature, storage temperature, motherboard temperature, battery temperature, whether the battery is charging or discharging, power consumption by application, and energy state of the computer. The energy state of the computer may include whether it is on, off, hibernating, or in a suspended or sleep mode. The data may be received through a network interface connector. The devices may be configured to send reports to a server, which may be part of a fleet management system. The data may be collected as part of routine data collection and include data other than thermal data, such as a printer toner level, versions of installed applications, a product ID, serial number of the device, serial numbers of components of the device, hardware or firmware versions, manufacturer and model, storage capacity, storage size, storage errors, driver crashes, boot errors, time to boot the device, and time to shut down the device. The data may be transmitted from the devices via a public or private network to the fleet management system. In various examples, non-thermal data may be used in detecting thermal issues. For example, driver crashes, boot errors, time to boot, and time to shutdown may be considered non-thermal, as they do not relate directly to temperature. However, these values may indicate a thermal issue is occurring and interfering with device operations.

An anomaly model may be applied to the data to produce an anomaly grade. An anomaly model may be created through machine learning to identify correlations in the received data or by a human expert performing an analysis of the data. For example, an increase in processor power or processor speed may correlate to an increase in processor temperature. The increase in processor temperature may correlate to an increased fan speed and other temperature zones on the device may also increase as heat is spread throughout the system.

Application of the anomaly model may produce an anomaly grade for that anomaly model. Multiple anomaly models may be applied to the data, producing distinct anomaly grades. The anomaly model may be a numeric grade, such as an integer ranging from 0 to 100. A lower numerical grade may indicate the data is not closely matching the expected anomaly model. For example, a fan speed may not be increasing or not increasing as much as expected when a processor temperature is increasing. This may be due to deterioration of the fan's motor, an accumulation of dust on the fan, obstruction of vents, an issue with the fan's control system, or an error with the processor temperature sensor.

The anomaly models corresponding to a device may be combined to produce a system thermal grade. This may be performed by calculating a mean of the anomaly grades. In calculating the mean, anomaly grades may be weighted differently. In various examples, the system thermal grade may be calculated by counting the number of anomaly grades that meet or fail to meet a threshold grade level.

The fleet management system may display the data to a user. The data may be displayed as a grid or chart showing the devices in the fleet or the devices within a device class of the fleet. A device class may, for example, include laptop and desktop computers, be limited to laptop computers, or include certain models of computers. In various examples, the display may be a grid with squares indicating a device in the fleet. The squares may be color coded to indicate which devices have an acceptable system thermal grade, which devices have a borderline system thermal grade and may benefit from maintenance, and which devices have a poor thermal grade and should be repaired or replaced. The display may allow selecting an individual device for additional information. A pop-up dialog box may provide information such as a serial number of the device, the system thermal grade, and anomaly grades. Where a large number of anomaly grades are available, the display may limit the displayed anomaly grades, such as displaying the lowest grades. The display may allow a user to bring up a display for the device. This device display may show a grid of the anomaly grades, color coded according to whether or not the anomaly grade indicates an issue. A user may be able to select a particular anomaly grade to bring up a pop-up dialog box providing information about the relevant components. A user may be able to select the anomaly grade and pull up a graph showing the change in the anomaly grade over time. When an individual device is selected, various components of the device may be represented on the display. The components may be color coded according to the anomaly grades that relate to that component. Selecting a component may bring up information regarding the serial number or other identifying information of the component and a list of anomaly models and corresponding anomaly grades relevant to the component.

Based on the system thermal grade and the anomaly grades for a device, a corrective action may be identified for the device. For example, a system thermal grade for a device may be low enough to be considered a poor grade or borderline grade. The anomaly grades may indicate that a cooling fan for the processor may not be operating correctly. The corrective action may be for the cooling fan to be replaced. Corrective actions may include replacing the device, repairing or replacing a component of the device, updating or uninstalling an application, updating or reimaging the operating system, assignment of the device to a different user, instructing the user about proper use of the device, cleaning the device, adjusting environmental temperature where the device is located, and repositioning of the device to reduce airflow obstructions.

The fleet management system may control the device to perform the corrective action. In various examples, control may include sending a message to the device. Sending a message may include making a remote procedural call, or interfacing with the device to automate the process of performing the corrective action. In various examples, sending a message may include sending an e-mail or system message instructing the user to schedule a service appointment. A message to the user may instruct the user on steps the user is to take to perform the corrective action. Instructions or messages to the user may be suggestions or may be enforced by the system. For example, in scheduling a service appointment, the device may not allow the user to proceed with device use until the appointment is scheduled, or may allow for device use for a limited amount of time before requiring the service appointment to be scheduled.

In various examples, the message may instruct the device to perform some operations, which may not involve user interaction. For example, the message may instruct the device to alter the system settings of the device, update the operating system or an application on the device, or to place the device or a component of the device in a safe mode. The message may include machine-readable instructions for execution by the device in performing the corrective action.

Figure 3:
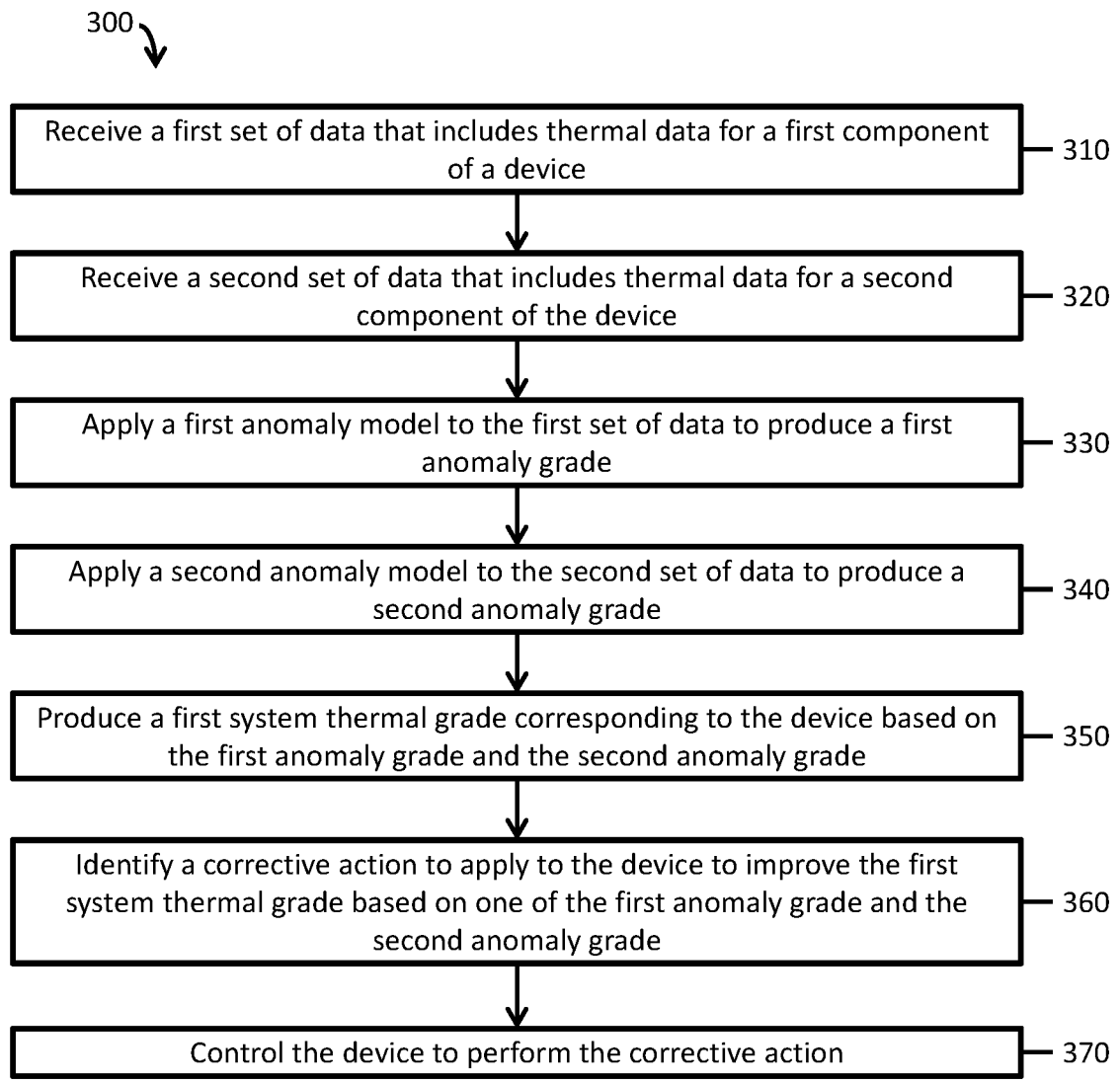
FIG. 3 shows a method of applying anomaly models to thermal data regarding components of a device in accordance with various examples.

FIG. 3 shows a method 300 of applying anomaly models to thermal data regarding components of a device in accordance with various examples. The method 300 includes receiving a first set of data that includes thermal data for a first component of a device (310). The method 300 includes receiving a second set of data that includes thermal data for a second component of the device (320). The method 300 includes applying a first anomaly model to the first set of data to produce a first anomaly grade (330). The method 300 includes applying a second anomaly model to the second set of data to produce a second anomaly grade (340). The method 300 includes producing a first system thermal grade corresponding to the device based on the first anomaly grade and the second anomaly grade (350). The method 300 includes identifying a corrective action to apply to the device to improve the first system thermal grade based on one of the first anomaly grade and the second anomaly grade (360). The method 300 includes sending a message to the device based on the corrective action (370).

In various examples, a device in the fleet of devices may include a battery. For example, a laptop computer may include a battery to power the laptop computer when the laptop computer is not plugged into an electrical outlet. Thermal data regarding the battery, such as a battery temperature, may be collected. Data regarding identification of the battery, such as a model number and a unique identifier may be collected as well. A corrective action may include replacement of the battery.

Figure 4:
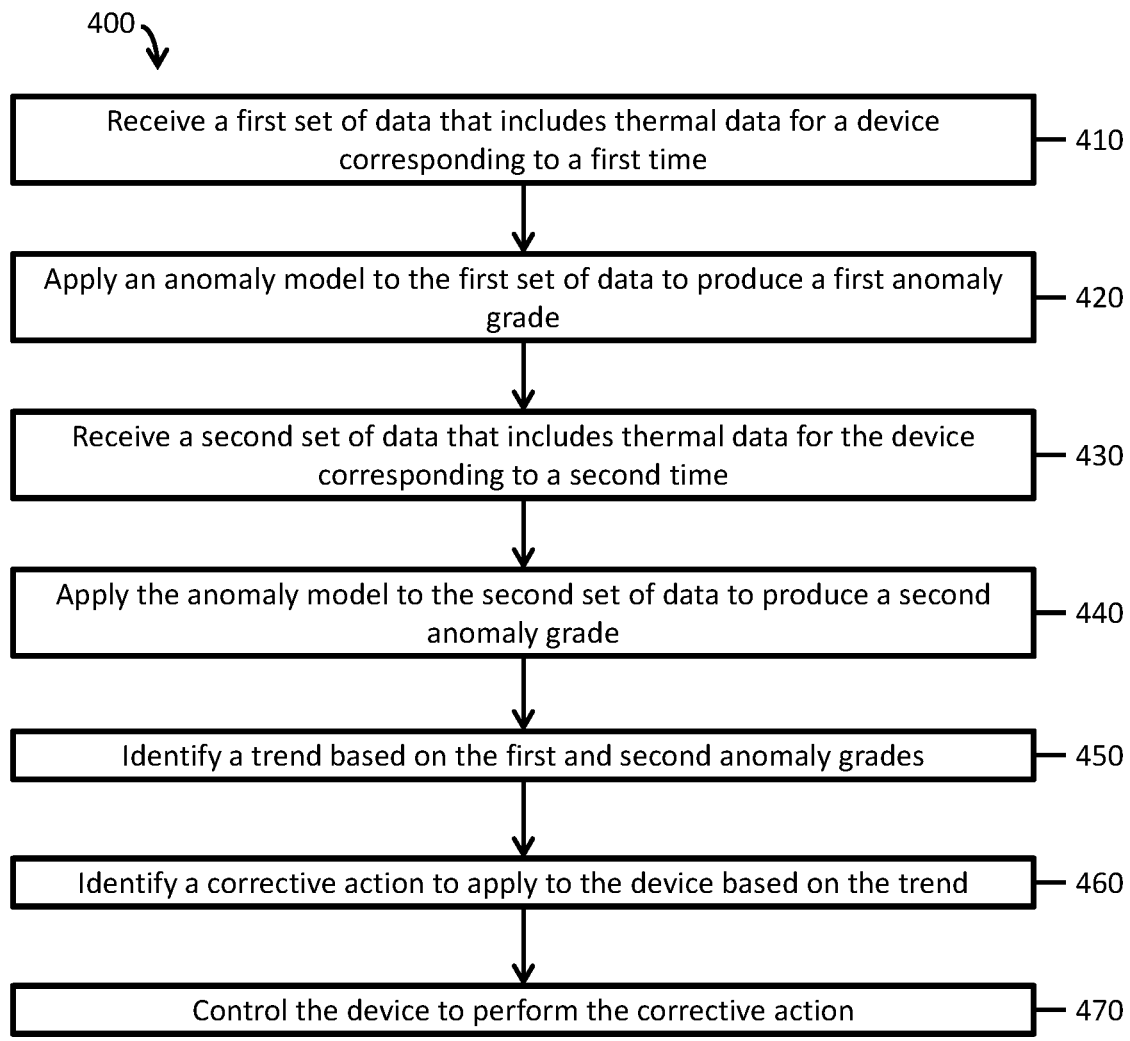
FIG. 4 shows a method of applying anomaly models to thermal data and identifying a corrective action based on a trend.

FIG. 4 shows a method 400 of applying anomaly models to thermal data and identifying a corrective action based on a trend. The method 400 includes receiving a first set of data that includes thermal data for a device corresponding to a first time (410). The method 400 includes applying an anomaly model to the first set of data to produce a first anomaly grade (420). The method 400 includes receiving a second set of data that includes thermal data for the device corresponding to a second time (430). The method 400 includes applying the anomaly model to the second set of data to produce a second anomaly grade (440). The method 400 includes identifying a trend based on the first and second anomaly grades (450). The method 400 includes identifying a corrective action to apply to the device based on the trend (460). The method 400 includes sending a message to the device based on the corrective action (470).

In various examples, data may be collected over time. For example, data may be collected for a device once every day, hour, or at some other time interval. Data regarding how the anomaly grades change over time may be stored. This data change over time may identify a trend. For example, the trend may show how a component's performance has declined over time or indicate a catastrophic event may have occurred. The corrective action for a gradual deterioration over time may be different than for a catastrophic event. A corrective action for a gradual deterioration over time may include repairing or replacing a component. A corrective action for a catastrophic event may include replacing the entire device.

The collected data may also be used in performing a product or subsystem analysis. The fleet of computers may include many devices of the same model. The collection of data may indicate that the model of devices tends to experience failure of the same component, such as a battery. This may indicate the battery should be replaced with a different model of battery. The manufacturer may also be notified of the issue, allowing the manufacturer to identify a defect in the battery or in the combination of that battery with that model of device.

In various examples, different models of devices may include common sub-systems. Three different laptop computers may share the battery, but have different processors. The data collection may include data that identifies the sub-systems. The data may be used by a manufacturer to identify that various combinations of sub-systems may not perform as well together as other combinations of sub-systems. For example, one model of a storage subsystem may have issues when combined with a specific model of motherboard, due to a blockage of airflow by supporting structures of the storage. The manufacturer could note the issue and revise the design of the storage, the motherboard, or ensure that the two sub-systems are not used on the same device in future device models.

Collection and analysis of the thermal data may lead to better identification of issues with subcomponents or with systems before the issues lead to catastrophic failures. The analysis could be integrated into the design and manufacturing pipeline for a device, providing information about interactions of various components and sub-systems in the field that may be difficult to adequately test during design. While individual components may undergo component testing and some system testing may be performed, it may be difficult for such testing to address the real-world or everyday use of devices. Collecting and analyzing in-use data from the devices may improve the overall design cycle of new components and devices, as individual component issues may be identified, as well as integration issues.

In various examples feedback from this data collection and analysis could be provided to component manufacturers. This could lead to a modified thermal design or improved systems integration testing for the components. Certain anomaly models may be created by the manufacturer of a component, such as the manufacturer of an SSD. The results of the application of the anomaly model to the data may be reported back to that manufacturer. This may be used as part of a beta testing process, so that in-use data may be collected before finalizing the manufacturing design for components.

In various examples, the data collection and analysis may be able to improve identification of root cause issues. For example, a storage may be experiencing errors due to overheating. Collection of thermal data across the device and collection of devices may indicate the storage may be overheating when the graphics processor is operating under a high load. Thus, the root cause may be the graphics processor or physical space between the graphics processor and storage, instead of the storage component alone having issues.

In various examples, thermal issues could be anticipated. For example, certain models of devices with specific combinations of components may begin exhibiting thermal issues after a period of time. Similar issues may be predicted for other models of devices with combinations of comparable components and corrective action taken to prevent component degradation. Potential issues may be flagged during the design process for future device models.

The above discussion is meant to be illustrative of the principles and various examples of the present disclosure. Numerous variations and modifications will become appar-

What is claimed is:

1. A non-transitory computer-readable medium to store machine-readable instructions that, when executed by a processor, cause the processor to:
   receive, through a network interface connector, a first set of data that includes thermal data and non-thermal data for a first device;
   apply a first anomaly model to the first set of data to produce a first anomaly grade;
   apply a second anomaly model to the first set of data to produce a second anomaly grade;
   produce a first system thermal grade corresponding to the first device based on the first anomaly grade and the second anomaly grade;
   identify a corrective action to apply to the first device to improve the first system thermal grade based on one of the first anomaly grade and the second anomaly grade; and
   control the first device to perform the corrective action.

2. The computer-readable medium of claim 1, wherein the machine-readable instructions, when executed by the processor, cause the processor to:
   receive a second set of data that includes thermal data and non-thermal data for a second device;
   apply the first anomaly model to the second set of data to produce a third anomaly grade;
   apply the second anomaly model to the second set of data to produce a fourth anomaly grade;
   produce a second system thermal grade corresponding to the second device based on the third anomaly grade and the fourth anomaly grade;
   display a fleet chart, the fleet chart including a representation of the first system thermal grade and a representation of the second system thermal grade;
   receive a command to display a device chart regarding the first device; and
   display the device chart in response to receipt of the command, the device chart including a representation of the first anomaly grade and the second anomaly grade.

3. The computer-readable medium of claim 1, wherein the corrective action includes updating of an application on the first device.

4. The computer-readable medium of claim 1, wherein the first device is assigned to a user and identification of the corrective action includes assignment of a second device to the user, the assignment based on the first anomaly grade and the second anomaly grade.

5. The computer-readable medium of claim 1, wherein the first set of data includes temperature data for a processor of the first device.

6. A non-transitory computer-readable medium to store machine-readable instructions that, when executed by a processor, cause the processor to:
   receive, through a network interface connector, a first set of data that includes thermal data and non-thermal data for a first component of a device;
   receive, through the network interface connector, a second set of data that includes thermal data and non-thermal data for a second component of the device, wherein the second component includes a battery of the device;
   apply a first anomaly model to the first set of data to produce a first anomaly grade;
   apply a second anomaly model to the second set of data to produce a second anomaly grade;
   produce a first system thermal grade corresponding to the device based on the first anomaly grade and the second anomaly grade;
   identify a corrective action to apply to the device to improve the first system thermal grade based on one of the first anomaly grade and the second anomaly grade; and
   control the device to perform the corrective action.

7. The computer-readable medium of claim 6, wherein the first component includes a processor of the device.

8. The computer-readable medium of claim 7, wherein the first set of data includes an identifier corresponding to the processor of the device.

9. The computer-readable medium of claim 6, wherein the first set of data includes a first temperature from a sensor at a first point in time and a second temperature from the sensor at a second point in time.

10. The computer-readable medium of claim 6, wherein the corrective action includes replacement of the first component in the device.

11. A non-transitory computer-readable medium to store machine-readable instructions that, when executed by a processor, cause the processor to:
    receive, through a network interface connector, a first set of data that includes thermal data and non-thermal data for a device corresponding to a first time;
    apply an anomaly model to the first set of data to produce a first anomaly grade;
    receive, through the network interface connector, a second set of data that includes thermal data and non-thermal data for the device corresponding to a second time;
    apply the anomaly model to the second set of data to produce a second anomaly grade;
    identify a trend based on the first and second anomaly grades;
    identify a corrective action to apply to the device based on the trend; and
    control the device to perform the corrective action.

12. The computer-readable medium of claim 11, wherein the identification of the corrective action includes identification of a component of the device to service.

13. The computer-readable medium of claim 12, wherein the corrective action includes scheduling a service appointment by a user of the device.

14. The computer-readable medium of claim 13, wherein the corrective action includes placing the device into a safe mode.

15. The computer-readable medium of claim 11, wherein the corrective action includes updating of an application on the device.

16. The computer-readable medium of claim 11, wherein the non-thermal data comprises driver crash data of the device, boot error data of the device, boot time data of the device, or shut down time data of the device.

* * * * *